United States Patent
Niitani et al.

(10) Patent No.: US 9,115,239 B2
(45) Date of Patent: Aug. 25, 2015

(54) COPOLYMER

(75) Inventors: Takeshi Niitani, Ichihara (JP); Yuichi Tateishi, Ichihara (JP); Toshiaki Okado, Ichihara (JP); Hidenori Naruse, Tokyo (JP); Tooru Kajita, Tokyo (JP)

(73) Assignee: NIPPON SODA CO., LTD., Tokyo (JP)

( * ) Notice: Subject to any disclaimer, the term of this patent is extended or adjusted under 35 U.S.C. 154(b) by 126 days.

(21) Appl. No.: 13/639,016

(22) PCT Filed: Apr. 8, 2011

(86) PCT No.: PCT/JP2011/002086
§ 371 (c)(1),
(2), (4) Date: Oct. 2, 2012

(87) PCT Pub. No.: WO2011/129078
PCT Pub. Date: Oct. 20, 2011

(65) Prior Publication Data
US 2013/0023628 A1    Jan. 24, 2013

(30) Foreign Application Priority Data

Apr. 14, 2010 (JP) ................................. 2010-092984

(51) Int. Cl.
*C08F 283/06* (2006.01)

(52) U.S. Cl.
CPC .................................. *C08F 283/06* (2013.01)

(58) Field of Classification Search
CPC ..... C08F 297/00; C08F 265/06; C08F 283/06
USPC ....................................................... 525/294
See application file for complete search history.

(56) References Cited

U.S. PATENT DOCUMENTS

| | | | |
|---|---|---|---|
| 5,085,698 A | 2/1992 | Ma et al. | |
| 5,221,334 A | 6/1993 | Ma et al. | |
| 5,262,244 A | 11/1993 | Faust et al. | |
| 5,272,201 A | 12/1993 | Ma et al. | |
| 2002/0077411 A1 | 6/2002 | Nakajima et al. | |
| 2005/0037160 A1 | 2/2005 | Suda et al. | |
| 2006/0052514 A1 | 3/2006 | Nakajima et al. | |
| 2008/0314292 A1 | 12/2008 | Shimanaka et al. | |
| 2010/0010148 A1 | 1/2010 | Imai et al. | |
| 2010/0143590 A1 * | 6/2010 | Held et al. | 427/256 |

FOREIGN PATENT DOCUMENTS

| | | | |
|---|---|---|---|
| EP | 1 197 537 A2 | 4/2002 | |
| JP | A-04-227668 | 8/1992 | |
| JP | A-05-179183 | 7/1993 | |
| JP | A-6-128336 | 5/1994 | |
| JP | A-06-136311 | 5/1994 | |
| JP | 2002-194037 | 7/2002 | |
| JP | A-2004-054213 | 2/2004 | |
| JP | 2009-024165 | 2/2009 | |
| WO | WO 03/074609 A1 | 9/2003 | |
| WO | WO 2008/105254 A1 | 9/2008 | |
| WO | WO 2010000725 A1 * | 1/2010 | ................ C08F 2/22 |
| WO | WO 2010/013651 A1 | 2/2010 | |

OTHER PUBLICATIONS

Nov. 21, 2013 Extended European Search Report issued in European Application No. 11768603.0.
Jul. 12, 2011 International Search Report issued in Patent Application No. PCT/JP2011/002086.
International Preliminary Report on Patentability issued in International Patent Application No. PCT/JP2011/002086 dated Nov. 6, 2012.

* cited by examiner

Primary Examiner — Mark Kaucher
(74) Attorney, Agent, or Firm — Oliff PLC

(57) ABSTRACT

The present invention provides a novel copolymer useful as a dispersing agent for a pigment or the like. The novel copolymer contains a block chain (A) consisting of a polymer comprising at least one repeating unit selected from the group consisting of a repeating unit having a tertiary amino group and a repeating unit having a quaternary ammonium base; and a block chain (B) consisting of a copolymer comprising a repeating unit having a polyoxyalkylene chain and a repeating unit having an acidic group.

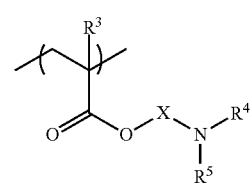

(II)

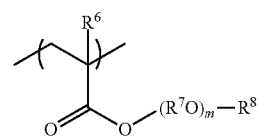

(III)

5 Claims, No Drawings

COPOLYMER

TECHNICAL FIELD

The present invention relates to a novel copolymer useful as a dispersing agent. The present application claims the benefit of priority from Japanese Patent Application No. 2010-092984, filed on Apr. 14, 2010, the contents of which are incorporated herein by reference.

BACKGROUND ART

Copolymer-type pigment dispersing agents have been developed in a variety of fields.

In the field of top coats for automotive finish, a pigment dispersion resin capable of providing an aqueous pigment dispersion that has, for example, low viscosity even at a high pigment concentration and is good at chromogenic properties as well as good in finished appearance and film performances of a coated film has been developed. Patent Document 1 describes a resin having a weight average molecular weight within a range of 3,000 to 100,000 obtained through copolymerization, performed in the presence of a radical polymerization initiator, of a monomer mixture consisting of a macromonomer (A) obtained by polymerizing monomer components consisting of at least one polymerizable monomer selected from methacrylic esters and styrene, and methacrylic acid if necessary, in the presence of a metal complex working as a catalytic chain transfer agent or an addition fragmentation chain transfer agent, and a radical polymerization initiator if necessary, a polymerizable unsaturated monomer (B) containing at least one ionic functional group selected from an amino group, a quaternary ammonium base and a sulfonic group, a non-ionic polymerizable unsaturated monomer (C) having a polyoxyalkylene chain, and another ethylenically unsaturated monomer (D). Specifically, it describes, for example, a copolymer obtained through polymerization of a macromonomer prepared from methyl methacrylate and methacrylic acid with styrene, methyl methacrylate, n-butyl methacrylate, 2-hydroxyethyl methacrylate, dimethylaminoethyl methacrylate and polyethylene glycol monomethacrylate.

Alternatively, in the fields of coatings, inks, building materials and the like, pigment dispersing agents minimally containing a volatile organic compound have been developed. Patent Document 2 describes, as a pigment dispersing agent minimally containing a volatile organic compound, a copolymer composed of an aromatic and/or heterocyclic vinyl monomer unit (a), a monomer unit (b) having an acid group, a (meth)acrylic acid ester monomer unit (c), and a monomer unit (d) having a polyalkylene (the alkylene having 2 to 6 carbon atoms) glycol chain having a number average molecular weight of 150 to 1500 or having a monoalkyl (the alkyl having 1 to 22 carbon atoms) ether chain of the glycol. Specifically, it describes, for example, a random copolymer of styrene, methyl methacrylate, ethyl methacrylate, methacrylic acid and PEG monomethyl ether methacrylate.

Alternatively, in the field of color liquid crystal displays, a pigment dispersion for a color filter used for manufacturing an optical color filter has been developed. In Patent Document 3, a block copolymer consisting of a pigment adsorbing block containing a basic group as a pigment adsorbing group and a block containing no pigment adsorbing group is used as a pigment dispersing agent for a color filter. Specifically, a block copolymer (Disperbyk-2001 manufactured by BYK Japan KK) consisting of a pigment adsorbing block containing a pigment adsorbing group with an amine number of 26 and an acid number of 18 and a block containing no pigment adsorbing group is used.

PRIOR ART DOCUMENTS

Patent Documents

Patent Document 1: Japanese Unexamined Patent Application Publication No. 2002-194037

Patent Document 2: Japanese Unexamined Patent Application Publication No. 2009-24165

Patent Document 3: Japanese Unexamined Patent Application Publication No. 2004-54213

SUMMARY OF THE INVENTION

Object to be Solved by the Invention

In recent years, in accordance with diversification of use of dispersing agents, a copolymer to be used as a dispersing agent has been required to have various characteristics.

For example, in the field of color liquid crystal displays, because of increasing demands for higher visible light transmittance and higher contrast, pigment particles are made further finer at least to a wavelength of visible light or smaller. In such fine particles, a specific surface area of the pigment particles is larger than that of general particles, and therefore, a copolymer conventionally used for a pigment dispersing agent has such problems that pigment dispersibility attained at an initial stage and dispersion stability attained over time are insufficient. Furthermore, although higher performances have recently been required in addition to the dispersion performance, conventional copolymers have a problem in which sufficient performances may not be attained.

Means to Solve the Object

The present inventors have earnestly studied for overcoming the aforementioned problems, resulting in finding that the problems may be overcome by using a novel copolymer comprising a block chain consisting of a polymer containing at least one repeating unit selected from the group consisting of a repeating unit having a tertiary amino group and a repeating unit having a quaternary ammonium base; and a block chain consisting of a copolymer containing a repeating unit having a polyoxyalkylene chain and a repeating unit having an acidic group, and thus, the present invention has been achieved.

Specifically, the present invention relates to:

(1) a copolymer comprising a block chain (A) consisting of a polymer comprising at least one repeating unit selected from the group consisting of a repeating unit having a tertiary amino group and a repeating unit having a quaternary ammonium base; and a block chain (B) consisting of a copolymer comprising a repeating unit having a polyoxyalkylene chain and a repeating unit having an acidic group;

(2) the copolymer according to (1), wherein the block chain (B) further comprises a repeating unit represented by formula (I):

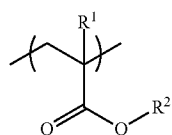

(I)

(wherein $R^1$ represents a hydrogen atom or a C1-C3 alkyl group, and $R^2$ represents a C1-C6 alkyl group or a C6-C10 aryl C1-C6 alkyl group);

(3) the copolymer according to (1) or (2), wherein the at least one repeating unit selected from the group consisting of a repeating unit having a tertiary amino group and a repeating unit having a quaternary ammonium base is a repeating unit represented by formula (II):

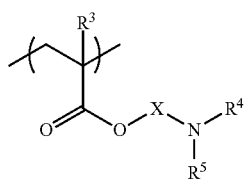

(II)

(wherein $R^3$ represents a hydrogen atom or a C1-C3 alkyl group, $R^4$ and $R^5$ each independently represent a C1-C6 alkyl group or a C6-C10 aryl C1-C6 alkyl group, and X represents a C1-C10 alkylene group or a C1-C10 alkylene-O—C1-C10 alkylene group);

(4) the copolymer according to any one of (1) to (3), wherein the repeating unit having a polyoxyalkylene chain is a repeating unit represented by formula (III):

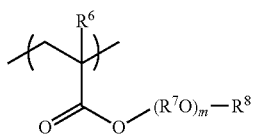

(III)

(wherein $R^6$ represents a hydrogen atom or a C1-C3 alkyl group, $R^7$ represents an alkylene group having 2 to 4 carbon atoms, $R^8$ represents a hydrogen atom or a C1-C6 alkyl group, m represents an integer of 2 to 150, and each $R^{70}$ may be the same as or different from one another); and (5) the copolymer according to any one of (1) to (4), wherein the repeating unit having an acidic group is a repeating unit represented by formula (IV):

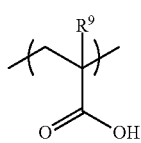

(IV)

(wherein $R^9$ represents a hydrogen atom or a C1-C3 alkyl group), or a repeating unit represented by formula (V):

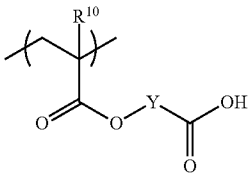

(V)

(wherein $R^{10}$ represents a hydrogen atom or a C1-C3 alkyl group, and Y represents a C1-C10 alkylene group or a C1-C10 alkylene-O—C1-C10 alkylene group).

MODE OF CARRYING OUT THE INVENTION (1) Copolymer

A copolymer of the present invention contains at least one block chain (A) and at least one block chain (B) described below.

Block chain (A): a polymer comprising at least one repeating unit selected from the group consisting of a repeating unit having a tertiary amino group and a repeating unit having a quaternary ammonium base.

Block chain (B): a copolymer comprising a repeating unit having a polyoxyalkylene chain and a repeating unit having an acidic group.

Furthermore, the copolymer of the present invention may contain another block chain in addition to the block chain (A) and the block chain (B).

1) Block Chain (A)

In the block chain (A), the repeating unit having a tertiary amino group and the repeating unit having a quaternary ammonium base are not particularly limited as far as they have such a cationic functional group on a side chain thereof.

Specifically, the polymer of the block chain (A) includes a homopolymer consisting of merely one repeating unit having a tertiary amino group or a repeating unit having a quaternary ammonium base, a copolymer consisting of two or more repeating units having a tertiary amino group or repeating units having a quaternary ammonium base, a copolymer consisting of at least one repeating unit having a tertiary amino group and at least one repeating unit having a quaternary ammonium base, and a copolymer of any of these polymers and another repeating unit derived from a copolymerizable monomer. The copolymer includes a random copolymer, an alternating copolymer, a block copolymer, and the like.

(Repeating Unit Having Tertiary Amino Group)

The repeating unit having a tertiary amino group is not particularly limited as far as it has a tertiary amino group, and an example is a repeating unit represented by the following general formula (VI):

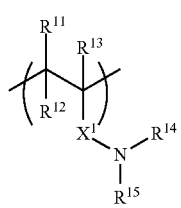

(VI)

In formula (VI), $R^{11}$, $R^{12}$ and $R^{13}$ each independently represent a hydrogen atom or a C1-C3 alkyl group. $X^1$ represents a group selected from the group consisting of a C1-C10 alkylene group, —COOR$^{16}$—, —CONHR$^{16}$—, —OCOR$^{16}$— and —R$^{17}$—OCOR$^{16}$— (wherein R$^{16}$ and R$^{17}$ each independently represent a C1-C10 alkylene group or a C1-C10 alkylene-O—C1-C10 alkylene group). R$^{14}$ and R$^{15}$ each independently represent a C1-C6 alkyl group or a C6-C10 aryl C1-C6 alkyl group.

Among these, a repeating unit represented by the following formula (II) is preferred:

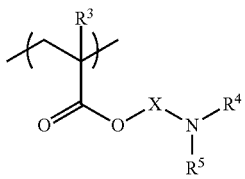

(II)

In formula (II), R$^3$ represents a hydrogen atom or a C1-C3 alkyl group, R$^4$ and R$^5$ each independently represent a C1-C6 alkyl group or a C6-C10 aryl C1-C6 alkyl group, and X represents a C1-C10 alkylene group or a C1-C10 alkylene-O—C1-C10 alkylene group.)

Here, examples of the C1-C3 alkyl group and the C1-C6 alkyl group include methyl, ethyl, n-propyl, i-propyl, n-butyl, s-butyl, i-butyl, t-butyl, n-pentyl and n-hexyl.

Examples of the C1-C10 alkylene group include a methylene chain, an ethylene chain, a propylene chain, a methyl ethylene chain, a butylene chain, a 1,2-dimethylethylene chain, a pentylene chain, a 1-methylbutylene chain, a 2-methylbutylene chain and a hexylene chain.

Examples of the C6-C10 aryl C1-C6 alkyl group include benzyl, phenethyl, 3-phenyl-n-propyl, 1-phenyl-n-hexyl, naphthalen-1-ylmethyl, naphthalen-2-ylethyl, 1-naphthalen-2-yl-n-propyl and inden-1-ylmethyl.

Examples of a monomer usable as a material for the repeating unit represented by formula (VI) or formula (II) include dimethylaminoethyl(meth)acrylate, dimethylaminopropyl(meth)acrylate, dimethylaminobutyl(meth)acrylate, diethylaminoethyl(meth)acrylate, diethylaminopropyl(meth)acrylate, and diethylaminobutyl(meth)acrylate.

(Repeating Unit Having Quaternary Ammonium Base)

The repeating unit having a quaternary ammonium base is not particularly limited as far as it has a quaternary ammonium base, and an example is a repeating unit represented by the following general formula (VII):

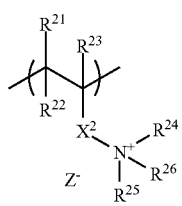

(VII)

In formula (VII), R$^{21}$, R$^{22}$ and R$^{23}$ each independently represent a hydrogen atom or a C1-C3 alkyl group. X$^2$ represents a group selected from the group consisting of a C1-C10 alkylene group, —COOR$^{27}$—, —CONHR$^{27}$—, —OCOR$^{27}$— and —R$^{28}$—OCOR$^{27}$— (wherein R$^{27}$ and R$^{28}$ each independently represent a C1-C10 alkylene group or a C1-C10 alkylene-O—C1-C10 alkylene group). R$^{24}$, R$^{25}$ and R$^{26}$ each independently represent a C1-C6 alkyl group or a C6-C10 aryl C1-C6 alkyl group. Z$^-$ represents a counter ion such as a halide ion, an alkyl halide ion, an alkyl carboxylate ion, a nitroxide ion, an alkyl sulfate ion, a sulfonate ion, a phosphate ion or an alkyl phosphate ion.

Here, examples of the C1-C3 alkyl group, the C1-C6 alkyl group, the C1-C10 alkylene group and the C6-C10 aryl C1-C6 alkyl group are the same as those described above with respect to formula (VI) representing the repeating unit having a tertiary amino group.

Among these, a repeating unit represented by formula (VIII) is preferred.

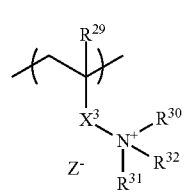

(VIII)

In formula (VIII), R$^{29}$ represents a hydrogen atom or a C1-C3 alkyl group. X$^3$ represents a C1-C10 alkylene group or a C1-C10 alkylene-O—C1-C10 alkylene group. R$^{30}$, R$^{31}$ and R$^{32}$ each independently represent a C1-C6 alkyl group or a C6-C10 aryl C1-C6 alkyl group. Z$^-$ represents a counter ion.)

Here, examples of the C1-C3 alkyl group, the C1-C6 alkyl group, the C1-C10 alkylene group and the C6-C10 aryl C1-C6 alkyl group are the same as those described above with respect to formula (VI) representing the repeating unit having a tertiary amino group.

Examples of a monomer usable as a material for the repeating unit represented by formula (VII) or formula (VIII) include (meth)acryloyloxyethyltrimethylammonium fluoride, (meth)acryloyloxyethyltrimethylammonium chloride, (meth)acryloyloxyethyltrimethylammonium bromide, (meth)acryloyloxyethyltrimethylammonium iodide, (meth)acryloyloxypropyltrimethylammonium fluoride, (meth)acryloyloxypropyltrimethylammonium chloride, (meth)acryloyloxypropyltrimethylammonium bromide, (meth)acryloyloxypropyltrimethylammonium iodide, (meth)acryloyloxybutyltrimethylammonium fluoride, (meth)acryloyloxybutyltrimethylammonium chloride, (meth)acryloyloxybutyltrimethylammonium bromide, and (meth)acryloyloxybutyltrimethylammonium iodide.

(Another Repeating Units that can be Contained)

Examples of another repeating unit that can be contained in the block chain (A) include repeating units derived from a (meth)acrylic acid-based monomer, an aromatic vinyl-based monomer, a conjugated diene-based monomer or the like.

Examples of the (meth)acrylic acid-based monomer, the aromatic vinyl-based monomer or the conjugated diene-based monomer usable as a material for the repeating unit are as follows.

Examples of the (meth)acrylic acid-based monomer include (meth)acrylic acid; (meth)acrylic acid ester compounds such as methyl(meth)acrylate, ethyl(meth)acrylate, n-propyl(meth)acrylate, i-propyl(meth)acrylate, n-butyl(meth)acrylate, i-butyl(meth)acrylate, s-butyl(meth)acrylate, t-butyl(meth)acrylate, hexyl(meth)acrylate, glycidyl(meth)acrylate, cyclohexyl(meth)acrylate, 2-ethylhexyl(meth)acrylate, 1-ethylcyclohexyl(meth)acrylate and benzyl(meth)acrylate; 2-methoxyethyl(meth)acrylate, methoxypolyethylene glycol (in which the number of ethylene glycol units is 2 to 100) (meth)acrylate, ethoxypolyethylene glycol(meth)acrylate, and phenoxypolyethylene glycol(meth)acrylate, and these monomers may be singly used or a mixture of two or more of them may be used.

Examples of the aromatic vinyl-based monomer include heteroaryl compounds such as styrene, o-methylstyrene, p-methylstyrene, p-t-butylstyrene, c-methylstyrene, p-t-butoxystyrene, m-t-butoxystyrene, p-(1-ethoxyethoxy)styrene, 2,4-dimethylstyrene, vinyl aniline, vinylbenzoic acid, vinylnaphthalene, vinylanthracene, 2-vinylpyridine, 4-vinylpyridine, 2-vinylquinoline, 4-vinylquinoline, 2-vinylthiophene, and 4-vinylthiophene, and these monomers may be singly used or a mixture of two or more of them may be used.

Examples of the conjugated diene-based monomer include 1,3-butadiene, isoprene, 2-ethyl-1,3-butadiene, 2-t-butyl-1,3-butadiene, 2-phenyl-1,3-butadiene, 2,3-dimethyl-1,3-butadiene, 1,3-pentadiene, 2-methyl-1,3-pentadiene, 3-methyl-1,3-pentadiene, 1,3-hexadiene, 2-methyl-1,3-octadiene, 4,5-diethyl-1,3-octadiene, 3-butyl-1,3-octadiene, 1,3-cyclopentadiene, 1,3-cyclohexadiene, 1,3-cyclooctadiene, 1,3-tricyclodecadiene, myrcene, and chloroprene, and these monomers may be singly used or a mixture of two or more of them may be used.

2) Block Chain (B)

The block chain (B) is a copolymer comprising at least one repeating unit having a polyoxyalkylene chain and at least one repeating unit having an acidic group.

The copolymer includes a random copolymer, an alternating copolymer, a block copolymer and the like.

(Repeating Unit Having Polyoxyalkylene Chain)

The repeating unit having a polyoxyalkylene chain included in the block chain (B) is not particularly limited as far as it has a polyoxyalkylene chain, and an example is a repeating unit represented by formula (IX):

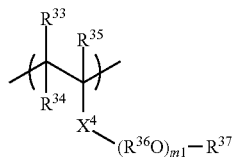

In formula (IX), $R^{33}$, $R^{34}$ and $R^{35}$ each independently represent a hydrogen atom or a C1-C3 alkyl group. $X^4$ represents a group selected from the group consisting of —COO—, —CONH—, —OCO— and —$R^{38}$—OCO— (wherein $R^{38}$ represents a C1-C10 alkylene group or a C1-C10 alkylene-O—C1-C10 alkylene group). $R^{36}$ represents a C2-C4 alkylene group. $R^{37}$ represents a hydrogen atom or a C1-C6 alkyl group, m1 represents an integer of 2 to 150, and each $R^{36}O$ may be the same as or different from one another.

Among these, a repeating unit represented by formula (III) is preferred:

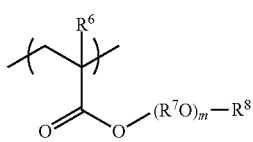

In formula (III), $R^6$ represents a hydrogen atom or a C1-C3 alkyl group, $R^7$ represents an alkylene group having 2 to 4 carbon atoms, $R^8$ represents a hydrogen atom or a C1-C6 alkyl group, m represents an integer of 2 to 150, and each $R^7O$ may be the same as or different from one another.

Here, examples of the C1-C3 alkyl group and the C1-C6 alkyl group include methyl, ethyl, n-propyl, i-propyl, n-butyl, s-butyl, i-butyl, t-butyl, n-pentyl and n-hexyl.

Examples of the C2-C4 alkylene group and the C1-C10 alkylene group include a methylene chain, an ethylene chain, a propylene chain, a methylethylene chain, a butylene chain, a 1,2-dimethylethylene chain, a pentylene chain, a 1-methylbutylene chain, a 2-methylbutylene chain and a hexylene chain.

In formulas (IX) and (III), each of m1 and m preferably represents 2 to 10.

Examples of a monomer usable as a material for the repeating unit represented by formula (III) include polyethylene glycol (2 to 150: which represents a value of m in formula (III); which is also applicable hereinafter) meth(acrylate), poly(ethylene glycol (1 to 75)/propylene glycol (1 to 75)) (meth)acrylate, and polypropylene glycol (2 to 150) (meth) acrylate, and these monomers may be singly used or a mixture of two or more of them may be used.

(Repeating Unit Having Acidic Group)

The repeating unit having an acidic group included in the block chain (B) is not particularly limited as far as it has an acidic group such as —OH, —COOH, —$SO_3H$, $SO_2NH_2$ or —$C(CF_3)_2$—OH, and an example is a repeating unit represented by formula (X):

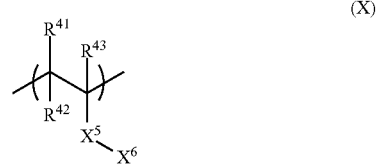

In formula (X), $R^{41}$, $R^{42}$ and $R^{43}$ each independently represent a hydrogen atom or a C1-C3 alkyl group. $X^5$ represents a single bond or a group selected from the group consisting of a C1-C10 alkylene group, —$COOR^{44}$—, —$CONHR^{44}$—, —$OCOR^{44}$— and —$R^{45}$—$OCOR^{44}$— (wherein $R^{44}$ and $R^{45}$ each independently represent a C1-C10 alkylene group or a C1-C10 alkylene-O—C1-C10 alkylene group. $X^6$ represents an acidic group such as —OH, —COOH, —$SO_3H$, —$SO_2NH_2$ or —$C(CF_3)_2$—OH.

Among the examples, a repeating unit represented by formula (IV) or (V) is preferred:

(wherein $R^9$ represents a hydrogen atom or a C1-C3 alkyl group.)

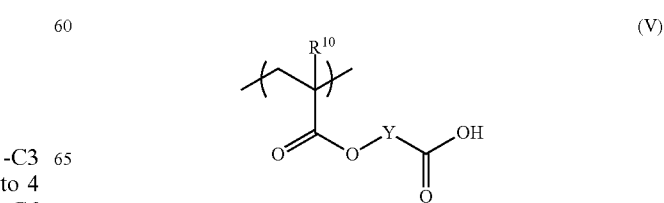

(wherein R¹⁰ represents a hydrogen atom or a C1-C3 alkyl group, and Y represents a C1-C10 alkylene group or a C1-C10 alkylene-O—C1-C10 alkylene group.)

Examples of a monomer usable as a material for the repeating unit represented by formula (X), (IV) or (V) are as follows.

Specific examples of a monomer having a carboxyl group include acrylic acid, methacrylic acid, acrylic acid carboxymethyl ester, and acrylic acid 2-carboxyethyl ester.

Examples of a monomer having a hydroxyl group as an acidic group include 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, 2-hydroxybutyl acrylate, 2-hydroxybutyl methacrylate, glycerol acrylate, glycerol methacrylate, ethylene glycol acrylate, ethylene glycol methacrylate, polyethylene glycol acrylate, polyethylene glycol methacrylate, propylene glycol acrylate, propylene glycol methacrylate, polypropylene glycol acrylate, polypropylene glycol methacrylate and vinyl alcohol.

Examples of a monomer having a sulfonic group as an acidic group include 2-acryloyloxyethylsulfonic acid, 2-methacryloyloxyethylsulfonic acid, sodium 2-acryloyloxyethylsulfonate, lithium 2-acryloyloxyethylsulfonate, ammonium 2-acryloyloxyethylsulfonate, imidazolium 2-acryloyloxyethylsulfonate, pyridinium 2-acryloyloxyethylsulfonate, sodium 2-methacryloxyethylsulfonate, lithium 2-methacryloxyethylsulfonate, ammonium 2-methacryloxyethylsulfonate, imidazolium 2-methacryloxyethylsulfonate, pyridinium 2-methacryloxyethylsulfonate, styrenesulfonic acid, sodium styrenesulfonate, lithium styrenesulfonate, ammonium styrenesulfonate, imidazolium styrenesulfonate, and pyridinium styrenesulfonate.

(Another Repeating Unit that can be Contained)

Examples of another repeating unit that can be contained in the block chain (B) include repeating units derived from a (meth)acrylic acid-based monomer, an aromatic vinyl-based monomer, a conjugated diene-based monomer and the like.

Among these, a repeating unit represented by the following formula (I) is preferred:

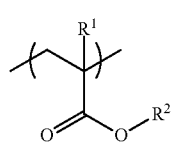

(I)

In formula (I), R¹ represents a hydrogen atom or a C1-C3 alkyl group, and R² represents a C1-C6 alkyl group or a C6-C10 aryl C1-6 alkyl group.

Here, examples of the C1-C3 alkyl group, the C1-C6 alkyl group and the C6-C10 aryl C1-6 alkyl group are the same as those described above with respect to formula (VI) representing the repeating unit having a tertiary amino group.

Here, examples of the C1-C3 alkyl group and the C1-C6 alkyl group include methyl, ethyl, n-propyl, i-propyl, n-butyl, s-butyl, i-butyl, t-butyl, n-pentyl and n-hexyl.

Examples of the C6-C10 aryl C1-C6 alkyl group include benzyl, phenethyl, 3-phenyl-n-propyl, 1-phenyl-n-hexyl, naphthalen-1-ylmethyl, naphthalene-2-ylethyl, 1-naphthalene-2-yl-n-propyl, and inden-1-ylmethyl.

Examples of the (meth)acrylic acid-based monomer, the aromatic vinyl-based monomer and the conjugated diene-based monomer usable as a material for the repeating unit are as follows.

Examples of the (meth)acrylic acid-based monomer include (meth)acrylic acid; (meth)acrylic acid ester compounds such as methyl(meth)acrylate, ethyl(meth)acrylate, n-propyl(meth)acrylate, i-propyl(meth)acrylate, n-butyl (meth)acrylate, i-butyl(meth)acrylate, s-butyl(meth)acrylate, t-butyl(meth)acrylate, hexyl(meth) acrylate, glycidyl(meth) acrylate, cyclohexyl(meth)acrylate, 2-ethylhexyl(meth)acrylate, 1-ethylcyclohexyl(meth)acrylate and benzyl(meth)acrylate; 2-methoxyethyl(meth)acrylate, methoxypolyethylene glycol (in which the number of ethylene glycol units is 2 to 100) (meth)acrylate, ethoxypolyethylene glycol(meth)acrylate, and phenoxypolyethylene glycol(meth)acrylate, and these monomers may be singly used or a mixture of two or more of them may be used.

Examples of the aromatic vinyl-based monomer include heteroaryl compounds such as styrene, o-methyl styrene, p-methyl styrene, p-t-butyl styrene, α-methyl styrene, p-t-butoxystyrene, m-t-butoxystyrene, p-(1-ethoxyethoxy)styrene, 2,4-dimethylstyrene, vinylaniline, vinylbenzoic acid, vinylnaphthalene, vinylanthracene, 2-vinylpyridine, 4-vinylpyridine, 2-vinylquinoline, 4-vinylquinoline, 2-vinylthiophene, and 4-vinylthiophene, and these monomers may be singly used or a mixture of two or more of them may be used.

Examples of the conjugated diene-based monomer include 1,3-butadiene, isoprene, 2-ethyl-1,3-butadiene, 2-t-butyl-1,3-butadiene, 2-phenyl-1,3-butadiene, 2,3-dimethyl-1,3-butadiene, 1,3-pentadiene, 2-methyl-1,3-pentadiene, 3-methyl-1,3-pentadiene, 1,3-hexadiene, 2-methyl-1,3-octadiene, 4,5-diethyl-1,3-octadiene, 3-butyl-1,3-octadiene, 1,3-cyclopentadiene, 1,3-cyclohexadiene, 1,3-cyclooctadiene, 1,3-tricyclodecadiene, myrcene, and chloroprene, and these monomers may be singly used or a mixture of two or more of them may be used.

(Block Chain that can be Contained in Copolymer in Addition to Block Chains (A) and (B))

The copolymer of the present invention may contain a block chain consisting of another polymer in addition to the block chains (A) and (B).

Examples of such a polymer include a homopolymer, a random copolymer, an alternating copolymer, and a block copolymer containing a repeating unit derived from a (meth)acrylic acid-based monomer, an aromatic vinyl-based monomer, a conjugated diene-based monomer or the like.

Examples of the (meth)acrylic acid-based monomer, the aromatic vinyl-based monomer and the conjugated diene-based monomer are the same as those described above.

(Ratio Between Block Chains (A) and (B) in Copolymer and their Physical Properties Such as Molecular Weights)

A ratio between the block chain (A) and the block chain (B) in the copolymer of the present invention is not particularly limited, and is 10 to 40:90 to 60 and preferably 15 to 35:85 to 65 in a wt % ratio. Furthermore, a content of the repeating unit having an acidic group in the copolymer is 0.5 to 20 wt % and preferably 1 to 15 mass %.

Also, a weight average molecular weight measured by GPC is preferably 2,000 to 50,000 and more preferably 2,000 to 20,000. As a dispersing agent in particular, it is preferably 4,000 to 30,000 and more preferably 4,000 to 15,000. A ratio between a weight average molecular weight and a number average molecular weight measured by GPC is 1.0 to 2.0, and preferably 1.0 to 1.5 particularly as a dispersing agent.

(2) Method for Producing Copolymer

A method for producing the block copolymer of the present invention is not particularly limited, and it may be produced by a known method, for example, by polymerizing monomers through living polymerization for obtaining a block copolymer. The living polymerization may be living radical polymerization or living anionic polymerization, between which the living anionic polymerization is more preferred.

For obtaining the block copolymer, monomers of the block chain (A) or (B) may be polymerized and the resultant may be successively polymerized with monomers of the other block into a block copolymer, or alternatively, monomers of the block chain (A) and the block chain (B) may be individually reacted to prepare blocks and the blocks may be combined thereafter. The living anionic polymerization is preferably employed because a composition and a molecular weight may be strictly controlled in this method.

In producing a block copolymer by the living anionic polymerization, the polymerization may be performed, for example, by adding a desired monomer dropwise to a solvent including an additive and a polymerization initiator. Here, in order to obtain a block polymer with a desired sequence, a reaction is caused by successively adding monomers of the respective blocks dropwise so as to attain a desired sequence.

In order to polymerize monomers of a given block and subsequently polymerize monomers of a next block, after completing the polymerization reaction of the former block, the monomers of the next block are started to add dropwise. Progress of a polymerization reaction may be checked by detecting a remaining amount of the monomers through gas chromatography or liquid chromatography. Furthermore, after completing the dropwise addition of the monomers of the former block, the resultant may be stirred for 1 minute to 1 hour, depending upon the types of monomers and solvent, before starting the dropwise addition of the monomers of the next block.

When a plurality of kinds of monomers are included in each block, these monomers may be individually or simultaneously added dropwise.

When the living anionic polymerization is employed for producing the copolymer, active hydrogen of a monomer having an acidic group is preferably protected. A repeating unit having an acidic group can be obtained by polymerizing a monomer having an acidic group protected by a protecting group and then deprotecting the protecting group.

Here, the protecting group is not particularly limited as far as it is a group known to be used as a protecting group for an acidic group in this technical field.

Examples of a protecting group for a carboxyl group include a methyl group, an ethyl group, a t-butyl group, a benzyl group, a methoxymethyl group and an ethoxyethyl group.

Examples of a protecting group for a hydroxyl group include a methoxymethyl group, a 2-methoxyethoxymethyl group, a bis(2-chloroethoxy)methyl group, a tetrahydropyranyl group, a 4-methoxytetrahydropyranyl group, a tetrahydrofuranyl group, a triphenylmethyl group, a trimethylsilyl group, a 2-(trimethylsilyl)ethoxymethyl group, a t-butyldimethylsilyl group, a trimethylsilylmethyl group, a t-butyl group, a t-butoxycarbonyl group, a t-butoxycarbonylmethyl group, and a 2-methyl-2-t-butoxycarbonylmethyl group.

It is generally difficult to polymerize a monomer having a quaternary ammonium base through the living anionic polymerization. Accordingly, in the case where a polymer comprising the repeating unit having a quaternary ammonium base is produced by the living anionic polymerization, a monomer used as a material for a repeating unit having a tertiary amino group is polymerized, and then the tertiary amino group may be quaternized by a known method. Examples of a quaternizing agent include general alkylating agents of alkyl halides such as benzyl chloride, benzyl bromide, benzyl iodide, methyl chloride, ethyl chloride, methyl bromide and methyl iodide, and alkyl sulfates such as dimethyl sulfate, diethyl sulfate and di-n-propyl sulfate.

In the case where the living radical polymerization is employed for producing the copolymer, the reaction may be carried out in the same manner as in employing the living anionic polymerization, or after polymerizing monomers of a given block, the resultant polymer is purified once before polymerizing a next monomer, so that the next monomer may be polymerized after removing a residue of the monomer remaining after the former reaction. In the case where it is preferred that the monomers of the respective blocks are not mixed with each other, the polymer is preferably purified.

An anionic polymerization initiator used in the polymerization of monomers is not particularly limited as far as it is a nucleophilic agent having a function to start polymerization of an anionic polymerizable monomer, and for example, an alkali metal or an organic alkali metal compound may be used.

Examples of the alkali metal include lithium, sodium, potassium and cesium. Examples of the organic alkali metal compound include alkylated substances, alkylated substances and arylated substances of the aforementioned alkali metals, among which alkyllithium is particularly preferred. Specifically, ethyllithium, n-butyllithium, sec-butyllithium, t-butyllithium, ethylsodium, lithiumbiphenyl, lithiumnaphthalene, lithiumtriphenyl, sodiumnaphthalene, potassiumnaphthalene, α-methylstyrenesodium dianion, 1,1-diphenylhexyllithium, 1,1-diphenyl-3-methylpentyllithium, 1,4-dilithio-2-butene, 1,6-dilithiohexane, polystyryllithium, cumylpotassium, cumylcesium or the like may be used. These anionic polymerization initiators may be singly used or a mixture of two or more of them may be used.

A usage of the anionic polymerization initiator is generally 0.0001 to 0.2 equivalent and preferably 0.0005 to 0.1 equivalent based on the entire amount of anionic polymerizable monomers to be used. When an anionic polymerization initiator is used in an amount of this range, a desired polymer may be produced in high yield.

A polymerization temperature employed in the present invention is not particularly limited as far as it falls within a temperature range where a side reaction of a transfer reaction or a termination reaction may be avoided and monomers may be consumed to complete the polymerization, and the polymerization is preferably carried out in a temperature range of −100° C. or higher and a boiling point of a solvent or lower. Furthermore, a concentration of monomers in a polymerization solvent is not particularly limited, and is generally 1 to 40 wt % and preferably 2 to 15 wt %.

The polymerization solvent used in the production method of the present invention is not particularly limited as far as it is not involved in the polymerization reaction and is compatible with polymers, and specific examples include polar solvents of ether-based compounds such as diethyl ether, tetrahydrofuran (THF), dioxane and trioxane, and tertiary amines such as tetramethylethylene diamine and hexamethylphosphoric triamide; and non-polar solvents or low-polar solvents of aliphatic, aromatics or alicyclic hydrocarbon compounds such as hexane and toluene. These solvents may be singly used or a mixture of two or more of them may be used as a mixed solvent. In the production method of the present invention, even when a non-polar solvent or a low-polar solvent is used together with a polar solvent, the polymerization may be accurately controlled, and for example, a non-polar solvent or a low-polar solvent may be used in a ratio of 5 vol % or more, 20 vol % or more, or 50 vol % or more based on the entire amount of the solvent.

In the present invention, dialkyl zinc such as diethyl zinc, dialkyl magnesium such as dibutyl magnesium, or an organic metal such as triethyl aluminum may be used as a polymerization stabilizer or a purifying agent for a monomer or a solvent if necessary.

In the present invention, an additive such as an alkali metal salt or an alkaline earth metal salt may be added at the start of or during the polymerization if necessary. Examples of such an additive include mineral acid salts or halides such as sulfates, nitrates, and borates of sodium, potassium, barium and magnesium, and more specifically, examples are chlorides, bromides and iodides of lithium or barium, lithium borate, magnesium nitrate, sodium chloride and potassium chloride. Among these additives, halides of lithium such as lithium chloride, lithium bromide, lithium iodide and lithium fluoride are preferred, and lithium chloride is particularly preferred.

(3) Use of Copolymer of the Invention

The copolymer of the present invention is very useful for dispersing a pigment in coating, printing ink, inkjet ink and a pigment dispersion for a color filter and the like.

EXAMPLES

The present invention will now be described in detail by way of Examples, which do not limit the technical scope of the invention.

Example 1

(Polymerization Process)

A 1000-mL flask was charged with 594.35 g of tetrahydrofuran (hereinafter sometimes abbreviated as THF) and 10.98 g of lithium chloride (a THF solution with a concentration of 3.63 wt %), and the resultant was cooled to −60° C. Thereafter, 7.89 g of n-butyllithium (a hexane solution with a concentration of 15.36 wt %) was added thereto, and the resultant was aged for 10 minutes.

Next, a mixed solution of 4.04 g of 1-ethoxyethyl methacrylate (hereinafter sometimes abbreviated as EEMA), 61.33 g of n-butyl methacrylate (hereinafter sometimes abbreviated as nBMA), and 26.19 g of methoxypolyethylene glycol monomethacrylate (PME-200 manufactured by NOF Corporation) (hereinafter sometimes abbreviated as PEGMA) was added dropwise thereto over 30 minutes, and the reaction was continued for 30 minutes after the dropwise addition. Then, the resultant was subjected to gas chromatography (hereinafter abbreviated as GC) and gel permeation chromatography (hereinafter abbreviated as GPC) (mobile phase: THF and DMF), so as to confirm disappearance of the monomers.

Next, 39.71 g of 2-(dimethylamino)ethyl (hereinafter sometimes abbreviated as DMMA) was added dropwise thereto, and the reaction was continued for 30 minutes after the dropwise addition. Then, the resultant was subjected to GC and GPC (mobile phase: DMF), and after thus confirming disappearance of the monomer, 3.21 g of methanol was added thereto to terminate the reaction.

The thus obtained copolymer was analyzed by GPC (mobile phase: DMF), whereby confirming that it is a copolymer having a molecular weight (Mw) of 5260, a molecular weight distribution of 1.09 and a composition ratio of DMMA-[nBMA/PEGMA/EEMA]=30-[47/20/3] wt %.

(Deprotection Process)

200 g of a propylene glycol monomethyl ether acetate (hereinafter sometimes abbreviated as PGMEA) solution of the thus obtained precursor polymer with a concentration of 50 wt % was heated to 160° C. for reacting for 3 hours.

The thus obtained copolymer was analyzed by GPC (mobile phase: DMF), whereby confirming that it is a copolymer having a molecular weight (Mw) of 5140, a molecular weight distribution of 1.08 and a composition ratio of DMMA-[nBMA/PEGMA/MA]=31-[47/20/2] wt % (wherein MA represents methacrylic acid).

Example 2

(Polymerization Process)

A 1000-mL flask was charged with 695.92 g of THF and 13.83 g of lithium chloride (a THF solution with a concentration of 3.63 wt %), and the resultant was cooled to −60° C. Thereafter, 9.29 g of n-butyllithium (a hexane solution with a concentration of 15.36 wt %) was added thereto, and the resultant was aged for 10 minutes.

Next, a mixed solution of 8.47 g of EEMA, 71.15 g of nBMA and 31.16 g of PEGMA was added dropwise thereto over 30 minutes, and the reaction was continued for 30 minutes after the dropwise addition. Then, the resultant was subjected to GC and GPC (mobile phase: THF and DMF), so as to confirm disappearance of the monomers.

Next, 45.39 g of DMMA was added dropwise thereto, and the reaction was continued for 30 minutes after the dropwise addition. Then, the resultant was subjected to GC and GPC (mobile phase: DMF), and after thus confirming disappearance of the monomer, 3.21 g of methanol was added thereto to terminate the reaction.

The thus obtained copolymer was analyzed by GPC (mobile phase: DMF), whereby confirming that it is a copolymer having a molecular weight (Mw) of 5610, a molecular weight distribution of 1.10 and a composition ratio of DMMA-[nBMA/PEGMA/EEMA]=29-[46/20/5] wt %.

(Deprotection Process)

213 g of a PGMEA solution of the thus obtained copolymer with a concentration of 50 wt % was heated to 160° C. for aging for 3.5 hours.

The thus obtained copolymer was analyzed by GPC (mobile phase: DMF), whereby confirming that it is a copolymer having a molecular weight (Mw) of 4800, a molecular weight distribution of 1.12 and a composition ratio of DMMA-[nBMA/PEGMA/MA]=30-[47/20/3] wt %.

Example 3

(Polymerization Process)

A 1000-mL flask was charged with 578.66 g of THF and 11.20 g of lithium chloride (a THF solution with a concentration of 3.63 wt %), and the resultant was cooled to −60° C. Thereafter, 7.34 g of n-butyllithium (a hexane solution with a concentration of 15.36 wt %) was added thereto, and the resultant was aged for 10 minutes.

Next, 4.30 g of methyl methacrylate (hereinafter sometimes abbreviated as MMA) was added thereto, and the reaction was continued for 5 minutes. Then, after confirming disappearance of the monomers by GC measurement, a part of the solution was sampled for GPC measurement (mobile phase: DMF), and production of a polymer having a molecular weight of 293 (a 2.92-mer) was found.

Next, a mixed solution of 4.52 g of EEMA, 19.80 g of 2-ethylhexyl methacrylate (hereinafter sometimes abbreviated as EHMA), 19.50 g of nBMA, 36.48 g of MMA, 15.03 g of benzyl methacrylate (hereinafter sometimes abbreviated as BzMA) and 11.99 g of PEGMA was added dropwise thereto over 30 minutes, and the reaction was continued for 30 minutes after the dropwise addition. Then, the resultant was subjected to GC and GPC (mobile phase: THF and DMF), whereby confirming disappearance of the monomers.

Next, 36.98 g of DMMA was added dropwise thereto, and the reaction was continued for 30 minutes after the dropwise addition. Then, the resultant was subjected to GC and GPO (mobile phase: DMF), and after thus confirming disappearance of the monomer, 3.21 g of methanol was added thereto to terminate the reaction.

The thus obtained copolymer was analyzed by GPO (mobile phase: DMF), whereby confirming that it is a copolymer having a molecular weight (Mw) of 6780, a molecular weight distribution of 1.08 and a composition ratio of DMMA-[MMA/nBMA/EHMA/PEGMA/BzMA/EEMA]=25-[28/13/13/8/10/3] wt %.

(Deprotection Process)

200 g of a PGMEA solution of the thus obtained copolymer with a concentration of 50 wt % was heated to 160° C. for reacting for 3 hours.

The thus obtained copolymer was analyzed by GPO (mobile phase: DMF), whereby confirming that it is a copolymer having a molecular weight (Mw) of 6120, a molecular weight distribution of 1.10 and a composition ratio of DMMA-[MMA/nBMA/EHMA/PEGMA/BzMA/MA]=25-[28/13/14/8/10/2] wt %.

Example 4

(Polymerization Process)

A 1000-mL flask was charged with 683.03 g of THF and 11.92 g of lithium chloride (a THF solution with a concentration of 3.63 wt %), and the resultant was cooled to −60° C. Thereafter, 8.32 g of n-butyllithium (a hexane solution with a concentration of 15.36 wt %) was added thereto, and the resultant was aged for 10 minutes.

Next, 5.06 g of MMA was added thereto, and the reaction was continued for 5 minutes. Then, after confirming disappearance of the monomers by GC measurement, a part of the solution was sampled for GPC measurement (mobile phase: DMF), and production of a polymer having a molecular weight of 311 (a 3.10-mer) was found.

Next, a mixed solution of 9.68 g of EEMA, 22.0 g of EHMA, 22.09 g of nBMA, 41.60 g of MMA, 16.83 g of BzMA and 13.75 g of PEGMA was added dropwise thereto over 30 minutes, and the reaction was continued for 30 minutes after the dropwise addition. Then, the resultant was subjected to GC and GPC (mobile phase: THF and DMF), whereby confirming disappearance of the monomers.

Next, 42.06 g of DMMA was added dropwise thereto, and the reaction was continued for 30 minutes after the dropwise addition. Then, the resultant was subjected to GC and GPC (mobile phase: DMF), and after thus confirming disappearance of the monomer, 4.48 g of methanol was added thereto to terminate the reaction.

The thus obtained copolymer was analyzed by GPC (mobile phase: DMF), whereby confirming that it is a copolymer having a molecular weight (Mw) of 6980, a molecular weight distribution of 1.10 and a composition ratio of DMMA-[MMA/nBMA/EHMA/PEGMA/BzMA/EEMA]=24-[27/13/13/8/10/5] wt %.

(Deprotection Process)

212.32 g of a PGMEA solution of the thus obtained precursor polymer with a concentration of 50 wt % was heated to 160° C. for reacting for 4 hours.

The thus obtained copolymer was analyzed by GPC (mobile phase: DMF), whereby confirming that it is a copolymer having a molecular weight (Mw) of 5300, a molecular weight distribution of 1.13 and a composition ratio of DMMA-[MMA/nBMA/EHMA/PEGMA/BzMA/MA]=25-[28/13/13/8/10/3] wt %.

Comparative Example 1

A 1000-mL flask was charged with 558.67 g of THF and 10.28 g of lithium chloride (a THF solution with a concentration of 3.63 wt %), and the resultant was cooled to −60° C. Thereafter, 7.60 g of n-butyllithium (a hexane solution with a concentration of 15.36 wt %) was added thereto, and the resultant was aged for 10 minutes.

Next, 4.38 g of MMA was added thereto, and the reaction was continued for 5 minutes. Then, after confirming disappearance of the monomers by GC measurement, a part of the solution was sampled for GPC measurement (mobile phase: DMF), and production of a polymer having a molecular weight of 346 (a 3.46-mer) was found.

Next, a mixed solution of 17.08 g of EHMA, 16.95 g of nBMA, 31.66 g of MMA, 8.01 g of BzMA and 9.48 g of PEGMA was added dropwise thereto over 30 minutes, and the reaction was continued for 30 minutes after the dropwise addition. Then, the resultant was subjected to GC and GPC (mobile phase: THF and DMF), whereby confirming disappearance of the monomers.

Next, 42.98 g of DMMA was added dropwise thereto, and the reaction was continued for 30 minutes after the dropwise addition. Then, the resultant was subjected to GC and GPC (mobile phase: DMF), and after thus confirming disappearance of the monomer, 2.40 g of methanol was added thereto to terminate the reaction.

The thus obtained copolymer was analyzed by GPC (mobile phase: DMF), whereby confirming that it is a copolymer having a molecular weight (Mw) of 7100, a molecular weight distribution of 1.10 and a composition ratio of DMMA-[MMA/nBMA/EHMA/PEGMA/BzMA]=33-[28/13/13/7/6] wt %.

The copolymer solutions obtained in Examples 1 to 4 and Comparative Example 1 were each used for obtaining 40 wt % propylene glycol monomethyl ether acetate solutions, and these solutions were used as pigment dispersing agents for preparing pigment dispersions as follows.

A pigment dispersion was prepared by mixing and dispersing, for 12 hours with a bead mill, 15 parts by mass of a 60/40 (mass ratio) mixture of C. I. Pigment Green 36 and C. I. Pigment Yellow 150 used as pigments, 10 parts by mass of the propylene glycol monomethyl ether acetate solution of any one of the copolymers obtained in Examples 1 to 4 and Comparative Example 1 used as the pigment dispersing agent, 55 parts by mass of propylene glycol monomethyl ether acetate and 20 parts by mass of diethylene glycol methylethyl ether used as solvents.

As a result, the pigment dispersions prepared by using the copolymers obtained in Examples 1 to 4 showed a color of brilliant green, and even after they were kept at 23° C. for 2 weeks, they exhibited viscosity values equivalent to those attained immediately after the preparation. On the other hand, although the pigment dispersion prepared by using the copolymer obtained in Comparative Example 1 showed a color of brilliant green, after it was kept at 23° C. for 2 weeks, its viscosity value was increased by 9% as compared with that attained immediately after the preparation.

Industrial Applicability

The copolymer of the present invention is good in pigment dispersibility, and may be used as, for example, a pigment dispersing agent for a color filter used for manufacturing an optical color filter.

The invention claimed is:

1. A copolymer comprising:
    a block chain (A) consisting of a polymer consisting of at least one repeating unit selected from the group consisting of:
        a repeating unit having a tertiary amino group represented by formula (VI):

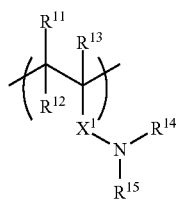

(VI)

wherein:
  $R^{11}$, $R^{12}$, and $R^{13}$ each independently represents a hydrogen atom or a C1-C3 alkyl group,
  $X^1$ represents a group selected from the group consisting of a C1-C10 alkylene group, —COOR$^{16}$—, —CONHR$^{16}$—, —OCOR$^{16}$—, and —R$^{17}$—OCOR$^{16}$—,
  $R^{16}$ and $R^{17}$ each independently represents a C1-C10 alkylene group or a C1-C10 alkylene-O—C1-C10 alkylene group, and
  $R^{14}$ and $R^{15}$ each represents a methyl group; and
a repeating unit having a quaternary ammonium base represented by formula (VII):

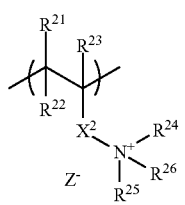

(VII)

wherein:
  $R^{21}$, $R^{22}$, and $R^{23}$ each independently represents a hydrogen atom or a C1-C3 alkyl group,
  $X^2$ represents a group selected from the group consisting of a C1-C10 alkylene group, —COOR$^{27}$—, —CONHR$^{27}$—, —OCOR$^{27}$—, and —R$^{28}$—OCOR$^{27}$—,
  $R^{27}$ and $R^{28}$ each independently represents a C1-C10 alkylene group or a C1-C10 alkylene-O—C1-C10 alkylene group,
  $R^{24}$, $R^{25}$ and $R^{26}$ each independently represents a C1-C6 alkyl group, and
  $Z^-$ represents a counter ion; and
a block chain (B) consisting of a copolymer comprising a repeating unit having a polyoxyalkylene chain and a repeating unit having an acidic group;
wherein a ratio between the block chain (A) and the block chain (B) in the copolymer is 10 to 40:90 to 60 in a wt % ratio, and a content of the repeating unit having an acidic group in the copolymer is 0.5 to 20 wt %.

2. The copolymer according to claim 1, wherein the copolymer of block chain (B) further comprises a repeating unit represented by formula (I):

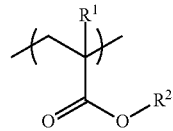

(I)

wherein $R^1$ represents a hydrogen atom or a C1-C3 alkyl group, and $R^2$ represents a C1-C6 alkyl group or a C6-C10 aryl C1-C6 alkyl group.

3. The copolymer according to claim 1, wherein the at least one repeating unit of block chain (A) is a repeating unit represented by formula (II):

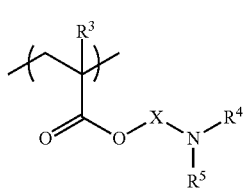

(II)

wherein:
  $R^3$ represents a hydrogen atom or a C1-C3 alkyl group,
  $R^4$ and $R^5$ each represents a methyl group, and
  X represents a C1-C10 alkylene group or a C1-C10 alkylene-O—C1-C10 alkylene group.

4. The copolymer according to claim 1, wherein the repeating unit having a polyoxyalkylene chain of block chain (B) is a repeating unit represented by formula (III):

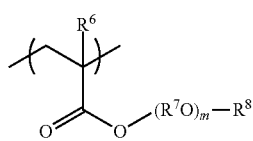

(III)

wherein:
  $R^6$ represents a hydrogen atom or a C1-C3 alkyl group,
  $R^7$ represents an alkylene group having 2 to 4 carbon atoms,
  $R^8$ represents a hydrogen atom or a C1-C6 alkyl group,
  m represents an integer of 2 to 150, and
  each $R^7O$ may be the same as or different from one another.

5. The copolymer according to claim 1, wherein the repeating unit having an acidic group of block chain (B) is:
  a repeating unit represented by formula (IV):

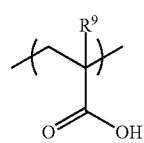

(IV)

wherein:
  $R^9$ represents a hydrogen atom or a C1-C3 alkyl group, or
    a repeating unit represented by formula (V):

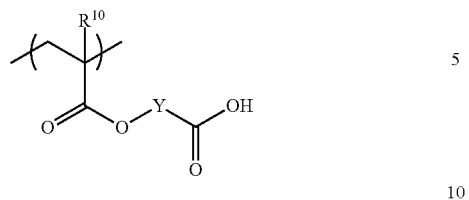
(V)
wherein:
R¹⁰ represents a hydrogen atom or a C1-C3 alkyl group and
Y represents a C1-C10 alkylene group or a C1-C10 alkylene-O—C1-C10 alkylene group.
* * * * *

UNITED STATES PATENT AND TRADEMARK OFFICE
CERTIFICATE OF CORRECTION

PATENT NO.        : 9,115,239 B2
APPLICATION NO.   : 13/639016
DATED             : August 25, 2015
INVENTOR(S)       : Takeshi Niitani It is certified that error appears in the above-identified patent and that said Letters Patent is hereby corrected as shown below:

In Column 3, line 51, please change "R70" to --$R^7O$--

In Column 5, line 60, please change "R2" to --$R^{23}$--

In Column 7, line 6, please change "c-methylstyrene" to --α-methylstyrene--

In Column 12, line 22, please change "alkylated substances" (second occurrence) to --allylated substances--

In Column 15, line 5, please change "GPO" to --GPC--

In Column 15, line 9, please change "GPO" to --GPC--

In Column 15, line 19, please change "GPO" to --GPC--

Signed and Sealed this
Tenth Day of May, 2016

Michelle K. Lee
*Director of the United States Patent and Trademark Office*